(12) United States Patent
Chen et al.

(10) Patent No.: US 9,167,237 B2
(45) Date of Patent: Oct. 20, 2015

(54) METHOD AND APPARATUS FOR PROVIDING 3-DIMENSIONAL IMAGE

(75) Inventors: Hanfeng Chen, Suwon-si (CN);
Hyung-rae Kim, Seoul (KR);
Tae-hyeun Ha, Suwon-si (KR);
Min-cheol Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 868 days.

(21) Appl. No.: 13/226,962

(22) Filed: Sep. 7, 2011

(65) Prior Publication Data

US 2012/0154381 A1    Jun. 21, 2012

(30) Foreign Application Priority Data

Dec. 20, 2010 (KR) ........................ 10-2010-0130800

(51) Int. Cl.
*H04N 7/18* (2006.01)
*H04N 13/04* (2006.01)
*G02B 27/22* (2006.01)

(52) U.S. Cl.
CPC ........ *H04N 13/0438* (2013.01); *G02B 27/2264* (2013.01)

(58) Field of Classification Search
CPC ............. H04N 13/0438; H04N 13/044; H04N 13/0025; H04N 13/0296; H04N 13/0431
USPC ............................ 348/36–39, 42–61; 345/419
See application file for complete search history.

(56) References Cited

U.S. PATENT DOCUMENTS

| 5,606,363 | A | * | 2/1997 | Songer | 348/49 |
| 5,650,814 | A | * | 7/1997 | Florent et al. | 348/39 |
| 5,671,007 | A | | 9/1997 | Songer | |
| 5,825,539 | A | * | 10/1998 | Hoshi | 359/462 |
| 6,456,432 | B1 | * | 9/2002 | Lazzaro et al. | 359/464 |
| 2002/0159527 | A1 | * | 10/2002 | Pelagotti et al. | 375/240.16 |
| 2005/0243077 | A1 | * | 11/2005 | Chung et al. | 345/204 |
| 2010/0054604 | A1 | * | 3/2010 | Kurokawa | 382/190 |
| 2010/0289974 | A1 | | 11/2010 | Kim et al. | |
| 2010/0328616 | A1 | * | 12/2010 | Silverstein et al. | 353/31 |
| 2011/0122233 | A1 | * | 5/2011 | Kasai et al. | 348/49 |

FOREIGN PATENT DOCUMENTS

CN    1126014 A    7/1996

OTHER PUBLICATIONS

Communication dated Nov. 25, 2014 issued by the Intellectual Property Office of the People's Republic of China in counterpart Chinese Patent Application No. 201110430290X.
Communication dated Sep. 10, 2014 issued by the European Patent Office in counterpart European Patent Application No. 11179389.9.

* cited by examiner

*Primary Examiner* — Andy Rao
(74) *Attorney, Agent, or Firm* — Sughrue Mion, PLLC

(57) ABSTRACT

A method and apparatus for providing a three-dimensional (3D) image are provided. The method includes receiving a left-eye image and a right-eye image, estimating an overlap region of the left-eye image and right-eye image; generating an overlap image based on the estimated overlap region; and controlling the left-eye image, the right-eye image and the overlap image to be output.

30 Claims, 9 Drawing Sheets

METHOD AND APPARATUS FOR PROVIDING 3-DIMENSIONAL IMAGE

CROSS-REFERENCE TO RELATED APPLICATION

This application claims priority from Korean Patent Application No. 10-2010-0130800, filed on Dec. 20, 2010 in the Korean Intellectual Property Office, the disclosure of which is herein incorporated by reference.

BACKGROUND

1. Field

Apparatuses and methods consistent with the exemplary embodiments relate to a method and apparatus for providing a three-dimensional (3D) image, and more particularly to a method and apparatus for providing a 3D image, in which the 3D image that is passing through the 3D glasses and is focused on a user is increased in brightness.

2. Description of the Related Art

Technology for a 3D is applied to various fields such as image information and communication, broadcasting, medical treatment, education and training, military applications, a game, an animation, virtual reality, computer-aided design (CAD), industrial technology, etc., and is a core technology for the next generation 3D multimedia information communication required in common by these many fields.

Generally, a cubic effect perceived by a human is based on combination of a degree of change in the thickness of a crystalline lens in accordance with a position of an object to be observed, a difference in an angle between a pair of eyes and the object, a difference in a position and a shape of the object between the left and right eyes, a parallax due to movement of the object, and various effects owing to psychology and memory, etc.

Among them, a binocular disparity caused because two eyes of a human are away from each other by about 6~7 cm in a horizontal direction is one of the most important factors in the cubic effect. That is, an object is viewed with a difference in an angle due to the binocular disparity, and this difference causes the eyes to have different images, respectively.

These two images are transmitted to the brain via the retina, and the brain perceives an original 3D image by combining the information from these two images exactly.

A 3D-image display apparatus is divided into a glasses type using special glasses, and a non-glasses type using no glasses. The glasses type includes a color filter type where images are separated and selected using color filters that complement each other, a polarizing filter type where a left eye image and a right eye image are separated using a lightproof effect based on combination of orthogonal polarizing devices, and a glasses shutter type where the left eye and the right eye are alternately shielded in response to a sync signal for projecting a left-eye video signal and a right-eye video signal to a screen.

The non-glasses type includes a parallax barrier type and a lenticular lens type.

The glasses type includes a passive type, an active type, and anaglyph type.

As the non-glasses type, the parallax barrier type and the lenticular lens type have been mostly used since they are convenient to be manufactured and easy to be realized. These two types are used by installing an optical plate such as the parallax barrier or the lenticular screen in a front or back of a display screen. Such types have a very narrow effective view and are available for only one person.

The glasses type is divided into a side-by-side type, a top and bottom type, a checker board type, and a sequential frame type, etc.

An apparatus for providing a 3D image encodes a 3D video signal and transmits a 3D display.

The 3D display is divided into a passive type and an active type in accordance with a method of reproducing the 3D video signal.

In the non-glasses type, a left-eye image and a right-eye image are displayed, and the left-eye image and the right-eye image are focused on a user's left and right eyes, respectively.

Since the left-eye image is focused on a user's left eye and the right-eye image is focused on a user's right eye in the non-glasses type, there may be no crosstalk between the left-eye image and the right-eye image.

In the glasses type, the left-eye image and the right-eye image are displayed in sequence, and the left-eye image and the right-eye image are respectively focused on a user's left and right eyes in accordance with synchronization for shutters of the 3D glasses.

In the glasses type, the left-eye image and the right-eye image displayed in sequence interfere with each other in accordance with synchronization for shutters of the 3D glasses, and therefore there may be crosstalk between the left-eye image and the right-eye image.

To prevent the crosstalk in the glasses type, a black image having no image is inserted between the left-eye image and the right-eye image.

The black image overlaps with the left-eye image and the right-eye image, so that each brightness of the left-eye image and the right-eye image can be decreased.

SUMMARY

One or more exemplary embodiments provide a method and apparatus for providing a 3D image, in which the 3D image passing through 3D glasses and focused on a user is increased in brightness.

According to an aspect of an exemplary embodiment, there is provided an apparatus for providing a 3D image, the apparatus including: a display panel; an image processing unit which receives a left-eye image and a right-eye image, estimates an overlap region of the left-eye image and right-eye image, and generates an overlap image on the basis of the estimated overlap region; and an image outputting unit which controls the left-eye image, the right-eye image and the overlap image to be output to the display panel.

The image processing unit may determine a pixel value of a first region of the overlap image relevant to the overlap region on the basis of a pixel value of the left-eye image or right-eye image, and determine a pixel value of a second region irrelevant to the overlap region on the basis of either the left-eye image or the right-eye image in accordance with a pixel brightness comparison.

The overlap region may be estimated based on blocks of pixels, or based on individual pixels.

The overlap region may include a first region configured with one of a brightness of the left-eye image and a brightness of the right-eye image, and a second region configured with a minimum brightness between the brightness of the left-eye image and the brightness of the right-eye image.

The image processing unit may adjust a brightness of each of the left-eye image and the right-eye image to be equal to or lower than a threshold brightness, and generate the overlap image based on the left-eye image that has been adjusted in brightness and the right-eye image that has been adjusted in brightness.

The image processing unit may increase a brightness of a part of at least one of the left-eye image that has been adjusted in brightness and the right-eye image that has been adjusted in brightness, and send the left-eye image or the right-eye image which has the part which has been increased in brightness, to the image outputting unit.

The overlap image may be configured with a minimum brightness between a brightness of a pixel of the left-eye image, and a brightness of a pixel of the right-eye image that is located at a position that corresponds to the pixel of the left-eye image.

The image outputting unit may output the generated images to the display panel so that the left-eye image, the generated overlap image and the right-eye image are sequentially displayed.

The left-eye image and the right-eye image may be moving pictures, respectively, and a brightness of a pixel of the left-eye image and positions corresponding to pixels of the left-eye image may be determined by taking into account a motion vector of an object included in the right-eye image.

The apparatus may further include 3D glasses and a controller that controls synchronization between the 3D glasses and the left-eye image, the right-eye image and the overlap image.

The 3D glasses may comprise shutters, and the controller may control on/off of the shutters so that the shutters are synchronized with at least one of the left-eye image, the right-eye image and the overlap image.

According to another aspect of an exemplary embodiment, there is provided an apparatus for providing a 3D image, the apparatus including: a display panel; an image processing unit which receives a left-eye image and a right-eye image; and a display window which displays a brightness mode for selecting enhanced brightness of the left-eye image and right-eye image, wherein the image processing unit, upon receiving a selection of the brightness mode, estimates an overlap region of the left-eye image and right-eye image, and generates an overlap image on the basis of the estimated overlap region.

According to another aspect of an exemplary embodiment, there is provided an apparatus for generating a 3-dimensional (3D) image, the apparatus including an image generating unit which generates a left-eye image and a right-eye image, and generates an overlap image configured with a minimum brightness between a brightness of a pixel of the left-eye image, and a brightness of a pixel of the right-eye image that is located at a position that corresponds to the pixel of the left-eye image; and an image outputting unit which outputs the generated left-eye image, the generated right-eye image and the generated overlap image.

According to another aspect of an exemplary embodiment, there is provided a method of providing a 3D image, the method including receiving a left-eye image and a right-eye image, estimating an overlap region of the left-eye image and right-eye image, generating an overlap image based on the estimated overlap region; and controlling the left-eye image, the right-eye image and the overlap image to be output.

The generation of the overlap image may include determining a first region of the overlap image relevant to the overlap region on the basis of a pixel value of the left-eye image or right-eye image; and determining a second region irrelevant to the overlap region on the basis of the left-eye image or the right-eye image in accordance with a pixel brightness comparison.

The overlap region may be estimated based on blocks of pixels, or based on individual pixels.

The overlap region may include a first region configured with one of a brightness of the left-eye image and a brightness of the right-eye image, and a second region configured with a minimum brightness between the brightness of the left-eye image and the brightness of the right-eye image.

The generating the overlap image may include adjusting a brightness of each of the left-eye image and the right-eye image to be equal to or lower than a threshold brightness, and generating the overlap image based on the left-eye image that has been adjusted in brightness and the right-eye image that has been adjusted in brightness.

The generating the overlap image may comprise increasing a brightness of a part of at least one of the left-eye image that has been adjusted in brightness and the right-eye image that has been adjusted in brightness, and outputting the left-eye image or the right-eye image which has the part which has been increased in brightness, to the image outputting unit.

The overlap image may be generated based on a minimum brightness between a brightness of a pixel of the left-eye image, and a brightness of a pixel of the right-eye image that is located at a position that corresponds to the pixel of the left-eye image.

The controlling may include outputting the left-eye image, the right-eye image and the overlap image so that the left-eye image, the generated overlap image and the right-eye image are sequentially displayed.

The left-eye image and the right-eye image may be moving pictures, respectively, and a brightness of a pixel of the left-eye image and positions corresponding to the pixels of the left-eye image may be determined by taking into account a motion vector of an object included in the right-eye image.

Synchronization may be controlled between 3D glasses and the left-eye image, the right-eye image and the overlap image.

The controlling synchronization may include controlling on/off of shutters of the 3D glasses so that the shutters are synchronized with at least one of the left-eye image, the right-eye image and the overlap image.

According to another aspect of an exemplary embodiment, there is provided a method for providing a 3D image, the method including receiving a left-eye image and a right-eye image; and displaying a brightness mode for selecting enhanced brightness of the left-eye image and right-eye image, receiving a selection of the brightness mode and, upon receiving the selection of the brightness mode, estimating an overlap region of the left-eye image and right-eye image, and generating an overlap image on the basis of the estimated overlap region.

According to another aspect of an exemplary embodiment, there is provided a method for generating a 3-dimensional (3D) image, the method including generating a left-eye image and a right-eye image, and generating an overlap image configured with a minimum brightness between a brightness of a pixel of the left-eye image, and a brightness of a pixel of the right-eye image that is located at a position that corresponds to the pixel of the left-eye image; and outputting the generated left-eye image, the generated right-eye image and the generated overlap image.

According to another aspect of an exemplary embodiment, there is provided a 3D imaging system including a display apparatus which displays a left-eye image, a right-eye image and an overlap image; and a 3D glasses which include shutters operating in sync with the left-eye image, the right-eye image and the overlap image and driven in accordance with a voltage, the overlap image being configured with a minimum brightness between a brightness of a pixel of the left-eye image, and a brightness of a pixel of the right-eye image that is located at a position that corresponds to the pixel of the left-eye image.

The shutters of the 3D glasses may be controlled by adjusting an amplitude of the voltage.

The shutters may include a left-eye shutter and a right-eye shutter, wherein the left-eye image and the overlap image neighboring to the left-eye image are synchronized with the left-eye shutter, and the right-eye image and the overlap image neighboring to the right-eye image are synchronized with the right-eye shutter.

According to another aspect of an exemplary embodiment, there is provided a computer readable medium recording a program for implementing at least one of the foregoing methods.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. However, the exemplary embodiments may be embodied in various forms without being limited to the exemplary embodiments set forth herein.

Figure 1:
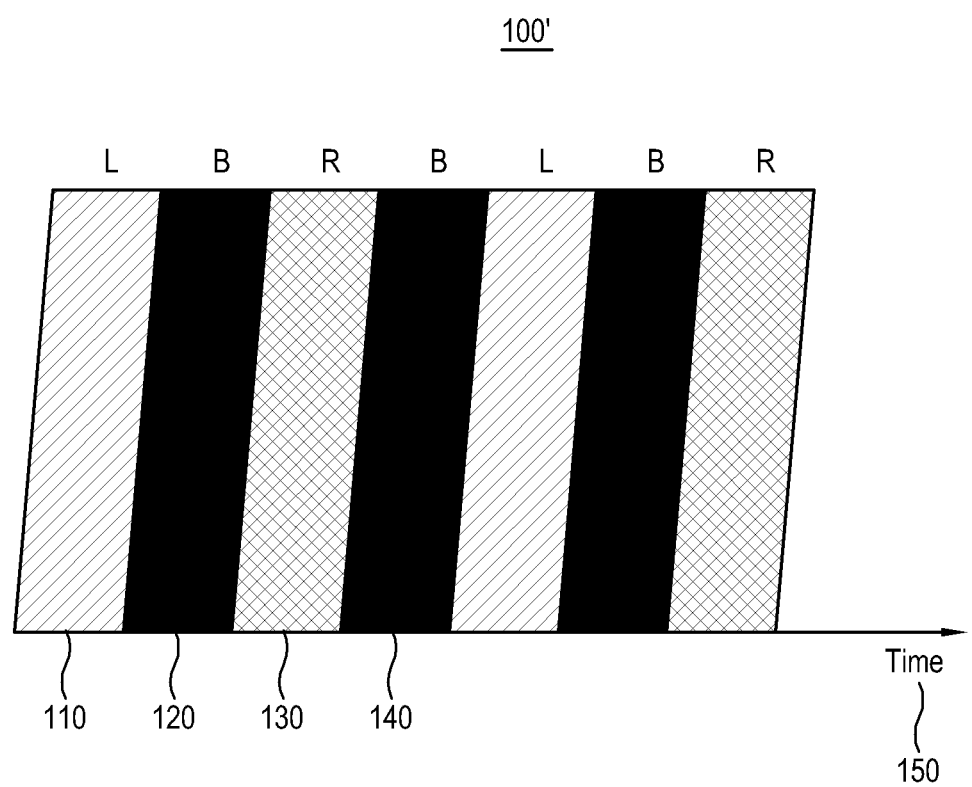
FIG. 1 illustrates technology where a left-eye image, a black image, and a right-eye image are displayed in an apparatus for providing a 3D image according to an exemplary embodiment.
Figure 2:
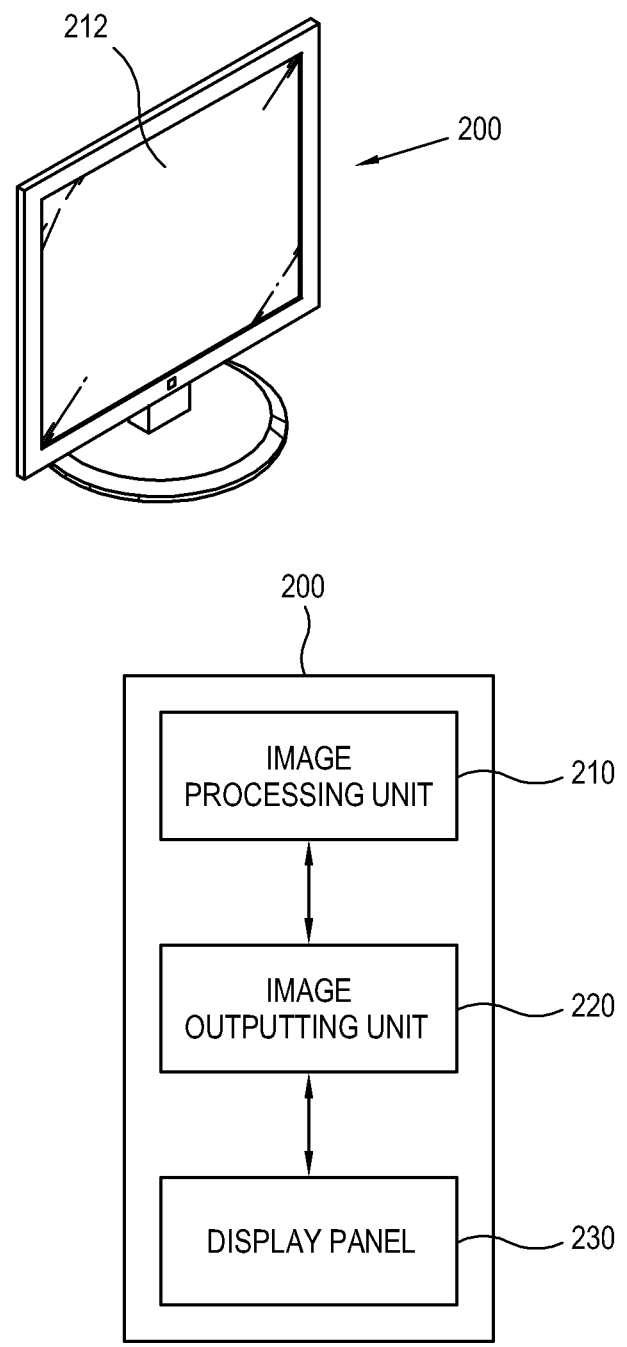
FIG. 2 is a block diagram of an apparatus for providing a 3D image according to an exemplary embodiment.
Figure 3:
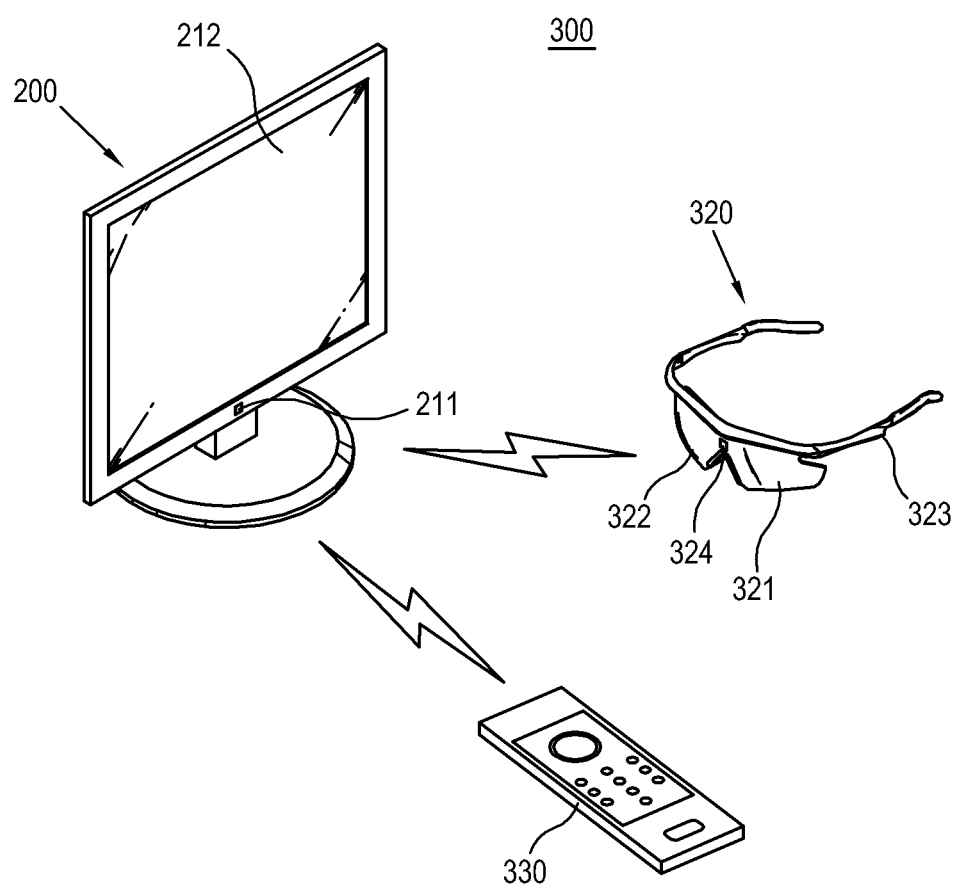
FIG. 3 is a block diagram schematically showing a 3D imaging system according to an exemplary embodiment.

FIG. 1 illustrates technology where a left-eye image, a black image, and a right-eye image are displayed in an apparatus for providing a 3D image, FIG. 2 is a block diagram of an apparatus for providing a 3D image according to an exemplary embodiment, and FIG. 3 is a block diagram schematically showing a 3D imaging system according to an exemplary embodiment.

Referring to FIG. 1, a 3D image 100' for a glasses type includes a left-eye image 110, black images 120 and 140 and a right-eye image 130 to be displayed through a display panel (not shown).

The left-eye image 110, the black images 120 and 140 and the right-eye image 130 may be displayed by a line scan method.

Here, 'L' indicates the left-eye image 110, 'B' indicates the black images 120 and 140, and 'R' indicates the right-eye image 130.

The left-eye image 110, the black images 120 and 140 and the right-eye image 130 may be output to an image outputting unit (not shown) in sequence according to time 150.

The black images 120 and 140 are black, having no brightness. The black images 120 and 140 are inserted between the left-eye image 110 and the right-eye image 130, and there is a period of time when the black images 120 and 140 overlap with the left-eye image 110 and the right-eye image 130 so that the brightness of the 3D image 100 can be decreased. Note that this overlap is not immediately apparent in FIG. 1.

For example, the left-eye image 110 and the black image 120 pass through a left-eye shutter (not shown) of a 3D glasses (not shown), and the right-eye image 130 and the black image 140 pass through a right-eye shutter (not shown) of the 3D glasses.

A user perceives brightness based on a combination of the brightness of the left-eye image 110 and the brightness of the black image 120, or a combination of the brightness of the right-eye image 130 and the brightness of the black image 140.

The left-eye image 110 has a brightness of 100 stilb (sb), and the black image 120 has a brightness of 0 sb, so that a left eye of a user can perceive a brightness of 50 sb. That is, 50=(100+0)/2 sb.

Likewise, the right-eye image 130 has a brightness of 100 sb, and the black image 140 has a brightness of 0 sb, so that a left eye of a user can perceive a brightness of 50 sb. That is, 50=(100+0)/2 sb.

For example, in order to increase the decreased brightness of the left-eye image 110 and the decreased brightness of the right-eye image 130 perceived by a user, a general apparatus for providing a 3D image may increase a peak current applied to each pixel of an organic light emitting diode (OLED), or a liquid crystal or backlight of a liquid crystal display, etc.

FIG. 2 is a block diagram of an apparatus for providing a 3D image according to an exemplary embodiment, and FIG. 3 is a block diagram schematically showing a 3D imaging system according to an exemplary embodiment.

Referring to FIG. 2, an apparatus 200 for providing a 3D image includes a display panel 212, an image processing unit 210, an image outputting unit 220 and a display unit 230. As shown in FIG. 3, a 3D imaging system 300 includes the 3D image providing apparatus 200, 3D glasses 320, and a control terminal 330.

The apparatus 200 for providing a 3D image may receive a 3D image from at least one of a television (TV) channel, a video cassette, a personal computer (PC), a digital versatile disc (DVD), and a video medium, and the like, and display the 3D image on the display panel 212.

The 3D image providing apparatus 200 may include a 3D TV, a 3D camcorder, a 3D camera, a 3D Blu-ray (BD) player, and a 3D optical device, or the like.

The 3D image providing apparatus 200 may support one of a two-dimensional (2D) mode, a multichannel 2D mode, a 3D mode and a multichannel 3D mode.

The 2D mode is used to display a 2D image, and the 3D mode is used to display a 3D image.

The multichannel mode is used to display different images at the same time.

The 3D image providing apparatus 200 may include a display panel 212 that includes the display unit 230, and the display panel 212 may include a user interface (UI).

The display unit 230 may show a menu on the display panel 212 that is selectable by a user, and receive a user's instruction.

A user may select a mode of an image displayed on the display panel 212.

The image processing unit 210 first estimates an overlap region between the left-eye image and the right-eye image. For convenience, an estimated overlap region will be called a region A, and a non-overlap region will be called a region B.

The image processing unit 210 determines a pixel value of the region A as a pixel value for the left-eye image or right-eye image in the overlap image.

On the other hand, the image processing unit 210 determines a pixel value of the region B in the overlap image by comparing brightness values of corresponding pixels of the left-eye image and the right-eye image.

For example, the image processing unit 210 determines a pixel value of the region B in the overlap image as the corresponding pixel value of the left-eye image if the corresponding brightness value of the left-eye image is lower than the corresponding brightness value of the right-eye image.

As another method of generating an overlap image, the image processing unit 210 may recognize a pixel having the lowest brightness among the pixels of the left-eye and right-eye images corresponding to a certain position, and determine a pixel of the overlap image at the certain position by the pixel having the lowest brightness.

In an alternative exemplary embodiment, the image processing unit 210 may generate an overlap image while scanning the left-eye and right-eye images with respect to blocks as well as pixels.

The image processing unit 210 according to an exemplary embodiment generates output data for displaying a 3D image, and controls input/output of data between elements.

The image outputting unit 220 may control the left-eye image, the right-eye image, and the overlap image to be output to the display panel 230.

The display unit 230 may be included in the display panel 312, and display the left-eye image, the right-eye image, and the overlap image processed by the image processing unit 210 under control of the image processing unit 220.

The 3D image providing apparatus 200 (also called display apparatus 200) includes a signal transceiver 211 and the display unit 212 and displays a stereoscopic image. The stereoscopic image includes a left-eye image for a left eye, and a right-eye image for a right eye.

A left-eye shutter 321 of the 3D glasses 320 is shut off if the right-eye image is displayed in the display apparatus 200, but transmits an image if the left-eye image is displayed. That is, if the left-eye image is displayed, the left-eye shutter 321 of the 3D glasses 320 shuts off the right-eye image and transmits the left-eye image. A right-eye shutter 322 of the 3D glasses 320 operates inversely to the left-eye shutter 321. That is, if the right-eye image is displayed, the right-eye shutter 322 of the 3D glasses 320 shuts off the left-eye image and transmits the right-eye image.

The display apparatus 200 may display the left-eye image and the right-eye image separately in accordance with frames, so that a user wearing the 3D glasses 320 can view an image stereoscopically though opening and shutting of the left-eye shutter 321 and the right-eye shutter 322.

Also, the display apparatus 200 may further include the signal transceiver 211 to receive a control signal from the control terminal 330. The display apparatus 200 may include various devices which can receive a 3D video signal from a video source that includes a TV, a monitor, and a mobile terminal such as a cellular phone, etc., and display the 3D video signal.

The signal transceiver 211 generates a sync signal and transmits the sync signal to the 3D glasses 320 so that the left-eye shutter 321 and the right-eye shutter 322 of the 3D glasses 320 can be opened and shut in sync with change in an image displayed on the display panel 212. The sync signal may be transmitted for every pair of left-eye image and right-eye image, i.e., every two frames, or may be transmitted for every one frame. The signal transceiver 211 may communicate with a signal receiver 324 of the 3D glasses 320 through wireless communication such as infrared communication, Bluetooth communication, a high frequency wireless local area network, radio frequency communication, and the like.

The display apparatus 200 may further include a signal receiver (not shown) for receiving a video signal from the video source, and a video signal processor (not shown) for processing a received video signal, etc.

The signal receiver of the display apparatus 200 transmits the received 3D image to the video signal processor.

The video signal processor may perform signal processing such as video decoding, format analysis, video scaling, etc., graphic user interface (GUI) addition, or the like operation with regard to the 3D image received by the signal receiver of the display apparatus 200.

The 3D image received by the signal receiver of the display apparatus 200 may have various formats. In particular, the 3D image may have a format based on a general frame sequential method, a top and bottom method, a side-by-side method, a horizontal interleave method, a vertical interleave method, and a checker-board method.

The display panel 212 displays an image based on the processed video signal.

The display panel 212 may include a liquid crystal display (LCD) panel having a liquid crystal layer, an organic light emitting diode (OLED) panel having an organic light emitting layer, a plasma display panel (PDP), etc. and a panel driver for driving the panel.

The 3D glasses 320 include a glasses body 323, and the left-eye shutter 321 and the right-eye shutter 322 are installed in the glasses body 323. Further, the left-eye shutter 321 and the right-eye shutter 322 may be opened and shut in sync with the left-eye image and the right-eye image displayed on the display apparatus 200. The 3D glasses 320, however, are not limited to any particular shape or style, as long as the 3D glasses include at least the left-eye shutter 321, the right-eye shutter 322, and the signal receiver 324.

The signal receiver 324 receives a sync signal from the display apparatus 200. Here, the signal receiver 324 may include an infrared receiver for receiving infrared light in accordance with various infrared communication methods. Alternatively, the signal receiver 324 may include a radio frequency (RF) receiver and operate based on an RF communication method.

The control terminal 330 may generate a control signal for controlling synchronization between the display apparatus 200 and the 3D glasses 320. Such a control signal may be provided to the 3D glasses 320.

A user may manipulate the control terminal 330 so that a user interface screen (not shown) related to a menu can be displayed on the display panel 212.

A user may manipulate the control terminal 330 so as to select an item (not shown) for controlling a driving signal of the left-eye shutter 321 and the right-eye shutter 322 of the 3D glasses 320 in the user interface screen.

Here, the item may be for controlling voltage amplitude of a driving signal for the left-eye shutter 321 and the right-eye shutter 322 or duty of a shutter-on driving signal.

By controlling the voltage amplitude, the left-eye shutter 321 and the right-eye shutter 322 of the 3D glasses can be controlled.

Figure 4:
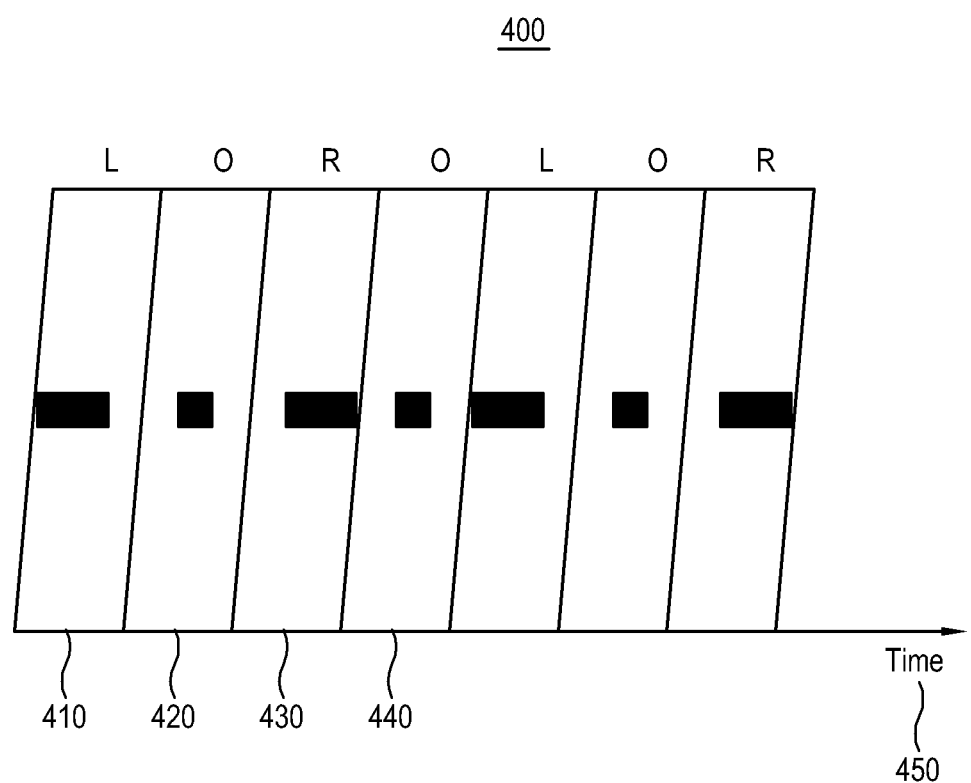
FIG. 4 shows an example where a left-eye image, an overlap image, and a right-eye image are displayed in an apparatus for providing a 3D image according to an exemplary embodiment.

FIG. 4 shows an example where a left-eye image, an overlap image, and a right-eye image are displayed in an apparatus for providing a 3D image according to an exemplary embodiment.

Referring to FIG. 4 relating to a 3D image 400 for the glasses type, a left-eye image 410, an overlap image 420, a right-eye image 430 and an overlap image 440 are sequentially output to the image outputting unit 220.

Here, 'L' indicates a left-eye image 410, 'O' indicates overlap images 420 and 440, and 'R' indicates a right image 430.

In accordance with time 450, the left-eye image 410, the overlap image 420, and the right-eye image 430 are sequentially output to the image outputting unit 220.

That is, the left-eye image 410, the overlap image 420, and the right-eye image 430 are repetitively output in this sequence, so that the 3D image for the glass type can be provided.

The overlap images 420 and 440 may be generated on the basis of results from estimating the overlap region between the left-eye image 410 and the right-eye image 430.

The overlap region may be estimated with respect to each block or pixel of the left-eye image 410 and the right-eye image 430.

That is, the overlap images 420 and 440 are images generated by comparing characteristic values of the left-eye image 410 with characteristic values of the right-eye image 430 in the positions between the left-eye image 410 and the right-eye image 430, selecting a characteristic value corresponding to the minimum value, and mapping the selected characteristic value to the same position of the left-eye image 410 or the same position of the right-eye image 430.

The characteristic value may be at least one of a brightness of a pixel, a brightness of a block including a pixel, a frequency value, a luminosity of a pixel, and a chroma of a pixel, and the like.

When generating the overlap images 420 and 440 by comparing the left-eye image 410 and the right-eye image 430, the overlap region is set by comparing the left-eye image 410 and the right-eye image 430 with respect to at least one of a whole region, a partial region, and a sampling region, and then the overlap images 420 and 440 are generated by comparing the characteristic values in the set overlap region.

According to an exemplary embodiment, if a difference value between the brightness of the left-eye image 410 and the brightness of the right-eye image 430 is equal to or lower than a threshold brightness value; for example, if a difference value between the brightness of the left-eye image 410 and the brightness of the right-eye image 430 is between −10 sb and +10 sb, it will be understood that there is no difference between the brightness of the left-eye image 410 and the brightness of the right-eye image 430.

The overlap images 420 and 440 may be configured with the brightness of the left-eye image 410 or the brightness of the right-eye image 430.

According to an exemplary embodiment, if a difference value between the brightness of the left-eye image 410 and the brightness of the right-eye image 430 is equal to or higher than a threshold brightness value; for example, if a difference value between the brightness of the left-eye image 410 and the brightness of the right-eye image 430 is equal to or lower than −10 sb or equal to or higher than +10 sb, it will be understood that there is a difference between the brightness of the left-eye image 410 and the brightness of the right-eye image 430.

The overlap images 420 and 440 may be configured with the minimum brightness between the brightness of the left-eye image 410, or the brightness of the right-eye image 430 at a position corresponding to the left-eye image 410.

For example, if a difference value between the brightness of the left-eye image 410 and the brightness of the right-eye image 430 is equal to or lower than the threshold brightness value; for example, if a difference value between the brightness of the left-eye image 410 and the brightness of the right-eye image 430 is between −10 sb and +10 sb, the overlap images 420 and 440 may be configured with the brightness of the left-eye image 410.

On the other hand, if a difference value between the brightness of the left-eye image 410 and the brightness of the right-eye image 430 is equal to or higher than the threshold brightness value; for example, if a difference value between the brightness of the left-eye image 410 and the brightness of the right-eye image 430 is equal to or lower than −10 sb or equal to or higher than +10 sb, the overlap images 420 and 440 may be configured with the brightness of the right-eye image 430 when the different value is positive, and may be configured with the brightness of the left-eye image 310 when the difference value is negative.

The overlap images 420 and 440 may include a first region configured with one of the brightness of the left-eye image 410 and the brightness of the right-eye image 430, and a second region configured with the minimum brightness between the brightness of the left-eye image 410 and the brightness of the right-eye image 430.

The image processing unit 210 can control the left-eye image 410 and the right-eye image 430, and generate and control the overlap images 420 and 440.

The image processing unit 210 can generate the brightness of the left-eye image 410 and the brightness of the right eye image 430 different from the brightness of the left-eye image and the brightness of the right-eye image that are received, by rescaling the left-eye image 410 and the right-eye image 430, or by taking the overlap between the left-eye image 410 and the overlap image 420, or between the right-eye image 430 and the overlap image 440, into account. That is, the image processing unit 210 can generate the brightness by rescaling the received left-eye image 410 and right-eye image 430. Alternatively, the image processing unit 210 can generate the brightness by taking into account the overlap between the left-eye image 410 and the overlap image 420, or by taking into account the overlap between the right-eye image 430 and the overlap image 440.

The process of generating brightness different from the received brightness will be described again later.

The image processing unit 210 transmits the left-eye image 410, the overlap images 420 and 440, and the right-eye image 430 to the image outputting unit 220 so that the image outputting unit 220 can output the generated images to the display unit 230 to thereby display the left-eye image 410, the overlap images 420 and 440, and the right-eye image 430 in sequence.

Since the overlap images 420 and 440 are generated on the basis of the left-eye image 410 and the right-eye image 430, the overlap image 420 and the overlap image 440 may be the same as each other.

The left-eye image 410 and the overlap image 420 are synchronized with the left-eye shutter 321 of the 3D glasses, and thus the left-eye image 410 and the overlap image 420 pass through the left-eye shutter 321 and are focused on the left-eye when the left-eye shutter 321 is on.

Similarly, the right-eye image 430 and the overlap image 440 are synchronized with the right-eye shutter 322 of the 3D glasses, and thus the right-eye image 420 and the overlap image 440 pass through the right-eye shutter 322 and are focused on the right-eye when the right-eye shutter 322 is on.

Also, the image processing unit may further include a controller, and synchronization can be controlled by data exchange between the controller and the 3D glasses 320 or the like.

That is, the controller can control synchronization between the 3D glasses 320 and the left-eye image 410, the overlap images 420 and 440 and the right-eye image 430.

The controller controls on/off timing of the shutters 321 and 322 of the 3D glasses to be synchronized with at least one of output timings of the left-eye image 410, the right-eye image 430 and the overlap images 420 and 440.

Figure 5:
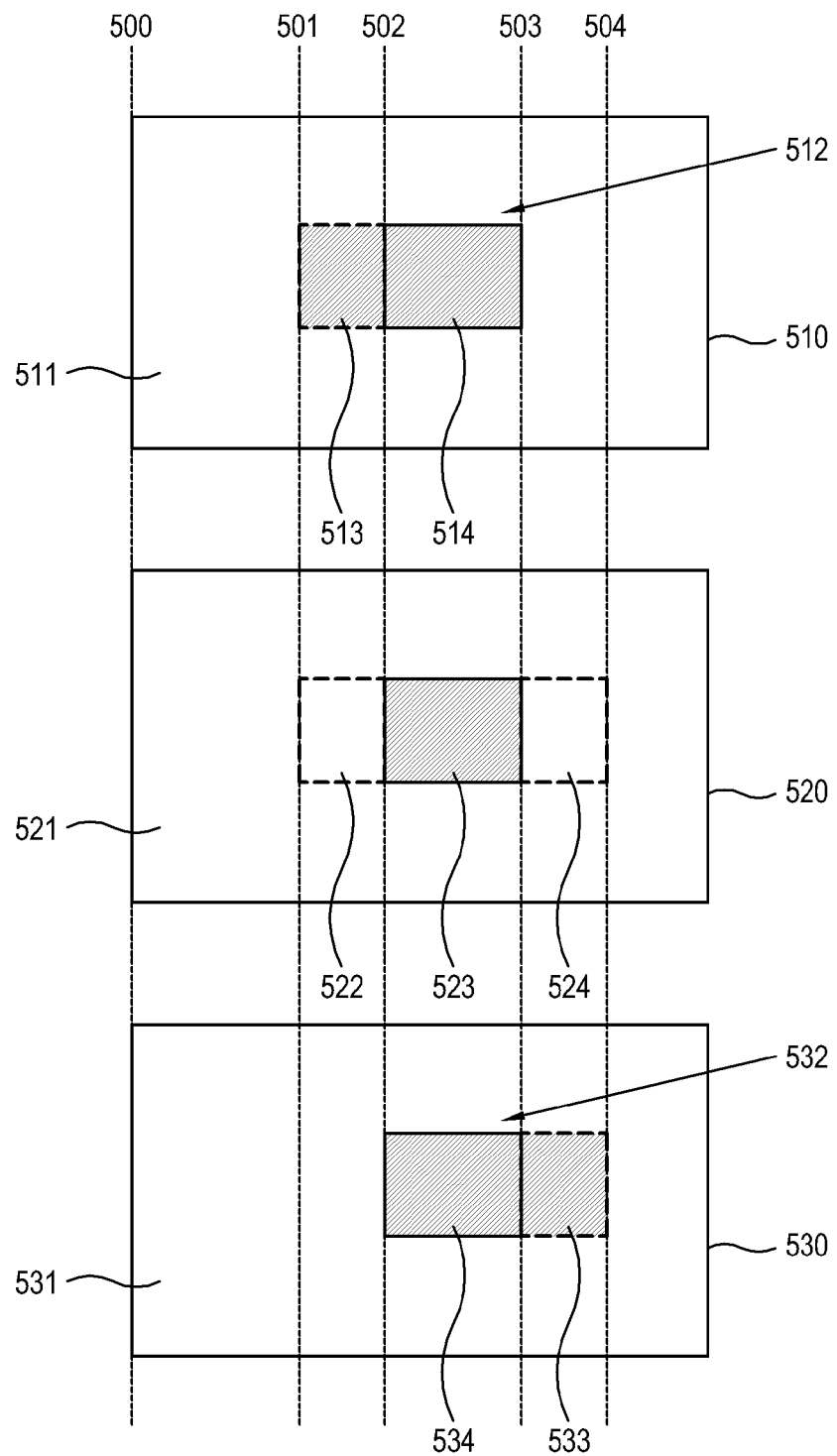
FIG. 5 shows an example of generating an overlap image using a left-eye image and a right-eye image according to an exemplary embodiment.

FIG. 5 shows an example of generating an overlap image using a left-eye image and a right-eye image according to an exemplary embodiment.

FIG. 5 shows a case where brightness of a "different point" between the left-eye image and the right-eye image is higher than the brightness of the other parts.

Referring to FIG. 5, the left-eye image 510, the overlap image 520 and the right-eye image 530 are sequentially displayed in accordance with time, but the left-eye image 510, the overlap image 520 and the right-eye image 530 are displayed with respect to a reference axis 500 to represent the same position.

The brightness of the left-eye image 510 and the brightness of the right-eye image 530 are mostly the same with each other, but there may be the "different point" having a little difference in brightness.

For example, a region corresponding to the "different point" may be a certain region 512 of the left-eye image and a certain region 532 of the right-eye image.

The region having the "different point" is caused by difference between an image focused on the left-eye and an image focused on the right-eye.

For example, if the certain region 512 of the left-eye image and the certain region 532 of the right-eye image are the same image, a left-side of the certain region 512 of the left-eye image may be aligned with a first axis 501 and a left-side of the certain region 532 of the right-eye image may be aligned with a second axis 502.

A right-side of the certain region 512 of the left-eye image may be aligned with a third axis 503 and a right-side of the certain region 532 of the right-eye image may be aligned with a fourth axis 504.

That is, the "different point" between the first and second axes or between the third and fourth axes may be the "different point" between the left-eye image 510 and the right-eye image 530.

According to an exemplary embodiment, the brightness of the certain region 511 of the left-eye image and the brightness of the certain region 531 may be mostly the same with each other, and the brightness of the certain region 512 of the left-eye image and the brightness of the certain region 532 may be the same with each other.

However, the brightness of the certain region 511 of the left-eye image and the brightness of the certain region 531 may be different from each other. Also, the brightness of the certain region 512 of the left-eye image and the brightness of the certain region 532 may be different from each other.

If the left-eye image 510 and the right-eye image 530 are overlapped with each other, it may be shown like the overlap image 520.

A certain region 521 and a certain region 523 are a region where the left-eye image 510 and the right-eye image 530 are overlapped with each other, and a certain region 522 and a certain region 524 are a region where the left-eye image 510 and the right-eye image 530 are not overlapped with each other.

Because the brightness of the overlap image 520 is configured with the minimum between the brightness of the left-eye image 510 and the brightness of the right-eye image 530, the certain region 521 may have either brightness of the certain region 511 or the certain region 531.

Also, the certain region 523 may have either brightness of the certain region 514 of the left-eye image 510 or the certain region 534 of the right-eye image 530.

Further, the certain region 522 may have the brightness of the certain region 531 of the right-eye image 530, and the certain region 524 may have the brightness of the certain region 511 of the left-eye image 510.

The certain region 513 of the left-eye image and the certain region 533 of the right-eye image are configured with brightness different from the respectively corresponding regions, so that the regions 522 and 524 matching with the overlap image 520 can be configured with the minimum brightness between the brightness of the left-eye image and the brightness of the right-eye image.

That is, the brightness of the certain region 522 in the overlap image may be configured with the brightness of the certain region 531 of the right-eye image, and the brightness of the certain region 524 in the overlap image may be configured with the brightness of the certain region 511 of the left-eye image.

For example, if the certain regions 511 and 531 have a brightness of 100 sb and the certain regions 512 and 532 have a brightness of 200 sb, the certain regions 522 and 524 of the overlap region have a brightness of 100 sb and the certain region 523 of the overlap region has a brightness of 200 sb.

Since the 3D glasses 320 are synchronized with the left-eye image, the overlap image and the right-eye image, the left-eye image 510 and the overlap image 520 pass when the left-eye shutter 321 of the 3D glasses operates, and the right-eye image 530 and the overlap image 520 pass when the right-eye shutter 322 of the 3D glasses operates.

The left-eye image 510 and the overlap image 520 passing through the left-eye shutter 321 are focused on a user's left eye, so that the user can perceive that the left-eye image 510 and the overlap image 520 are overlapped with each other.

The certain region 513 of the left-eye image and the certain region 522 of the overlap image are configured with different brightness, and thus the relatively high brightness becomes lower and the relatively low brightness becomes higher because of an overlapping effect when overlapping with each other.

Thus, a user can perceive lower brightness or higher brightness, i.e., different brightness from the original brightness of the certain region 513 of the certain region 513 of the left-eye image.

To remove the overlapping effect, the certain region 513 of the left-eye image is increased in brightness, and then the left-eye image, having the increased brightness, is transmitted to the display unit 230.

For example, if the certain region 522 of the overlap image has a brightness of 100 sb and the certain region 513 of the left-eye image has a brightness of 200 sb, a user perceives a brightness of 150 sb=(200 sb+100 sb)/2 based on combination between the certain region 513 of the left-eye image and the certain region 522 of the overlap image.

Since the certain region 513 of the left-eye image has the brightness of 200 sb, the brightness of the certain region 513 of the left-eye image may be increased by about 1.5 times up to 300 sb so as to eliminate a phenomenon where the brightness of the certain region 513 of the left-eye image is overlapped with and lowered by the brightness of the certain region 522 of the overlap image.

After increasing the brightness of the certain region 513 of the left-eye image, a user can perceive a brightness of 200 sb=(200 sb*1.5+100)/2), which the certain region 513 of the left-eye image originally has, even though the brightness of the certain region 513 of the left-eye image is overlapped with the brightness of the certain region 522 of the overlap image.

Likewise, the brightness of the certain region 533 of the right-eye image may be increased by about 1.5 times so as to eliminate the effect of decrease in the brightness of the certain region 533 of the right-eye image due to overlap with the certain region 524 of the overlap image.

Figure 6:
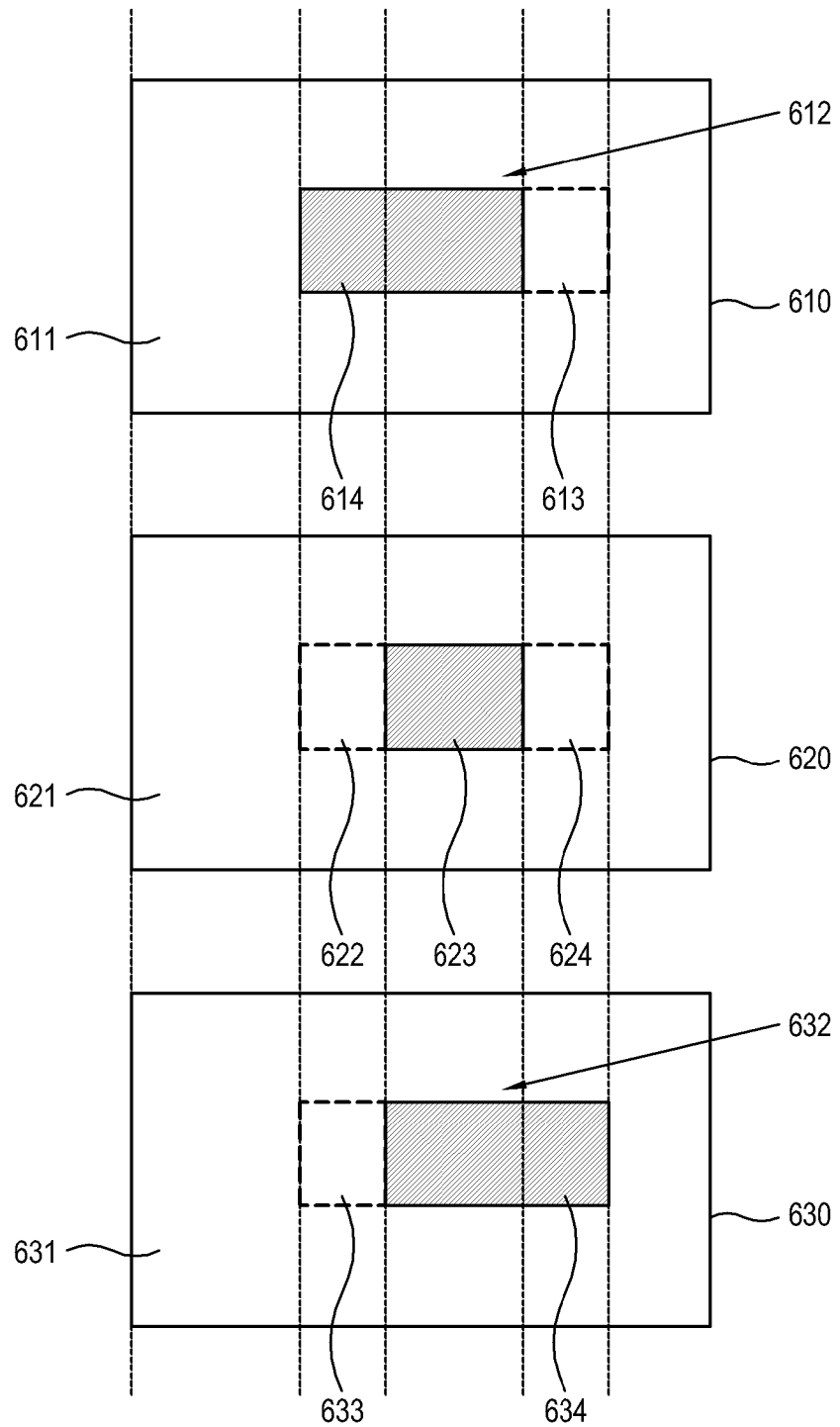
FIG. 6 shows another example of generating an overlap image using a left-eye image and a right-eye image according to an exemplary embodiment.

FIG. 6 shows another example of generating an overlap image using a left-eye image and a right-eye image according to an exemplary embodiment.

FIG. 6 shows the same principle as that of FIG. 5, but illustrates a case where the brightness of the "different point" between the left-eye image and the right-eye image is lower than those of the other parts.

For example, because the overlap image 620 is configured with the minimum brightness between the brightness of the left-eye image 610 and the brightness of the right-eye image 630, if the certain region 611 of the left-eye image 610 and the certain region 631 of the right-eye image 630 have a brightness of 200 sb and the certain region 612 of the left-eye image 610 and the certain region 632 of the right-eye image 630 have a brightness of 100 sb, the certain regions 622 and 624 of the overlap region 620 have a brightness of 100 sb and the certain region 623 of the overlap region 620 has a brightness of 100 sb.

Since the certain region 613 of the left-eye image and the certain region 624 of the overlap image have a brightness of 100 sb, a user perceives that the certain region 513 of the left-eye image has a brightness of 100 sb.

Because the certain region 613 of the left-eye image has a brightness of 200 sb, the brightness of the certain region 613 of the left-eye image may be increased by about 1.5 times up to 300 sb so as to eliminate a phenomenon where the brightness of the certain region 613 of the left-eye image is overlapped with and lowered by the brightness of the certain region 624 of the overlap image.

On the other hand, although the certain region 614 of the left-eye image and the certain region 622 of the overlap image having a brightness of 100 sb are overlapped with each other, there is no need of increasing or decreasing the brightness since the certain region 614 of the left-eye image has the same brightness of 100 sb.

Similarly, the brightness of the certain region 633 of the right-eye image may be increased by about 1.5 times so as to eliminate a phenomenon where the brightness of the certain region 633 of the right-eye image is overlapped with and lowered by the brightness of the certain region 622 of the overlap image.

On the other hand, although the certain region 634 of the right-eye image and the certain region 624 of the overlap image having a brightness of 100 sb are overlapped with each other, there is no need of increasing or decreasing the brightness since the certain region 634 of the right-eye image has the same brightness of 100 sb.

Figure 7:
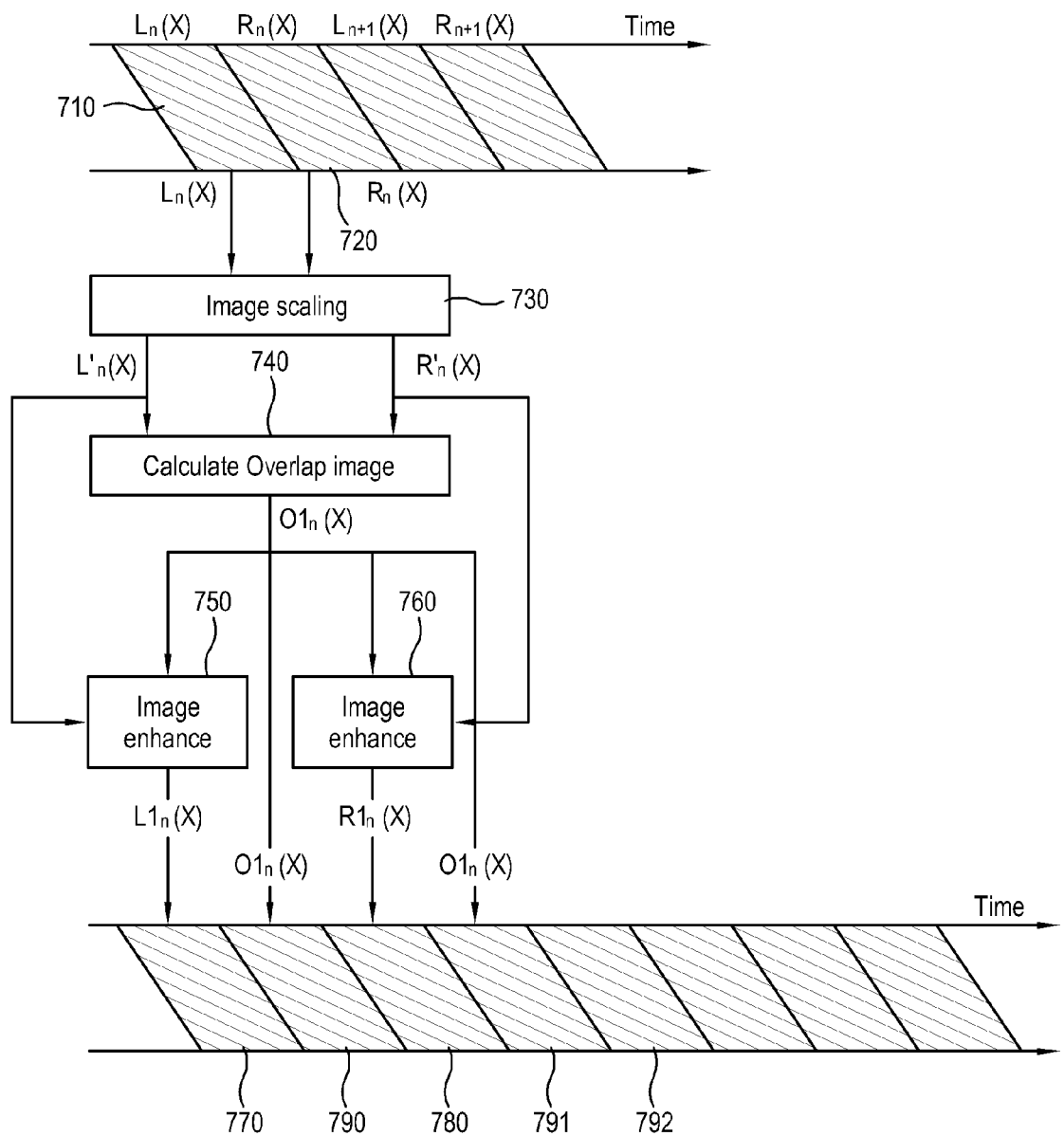
FIG. 7 shows an example of generating an overlap image when a 3D image according to an exemplary embodiment is a still image.

FIG. 7 shows an example of generating an overlap image when a 3D image according to an exemplary embodiment is a still image.

FIG. 7 shows a process of generating overlap images 790 and 791 on the basis of a left-eye image 710 and a right-eye image 720.

As described with reference to FIGS. 5 and 6, the brightness of the certain region of the left-eye image or the brightness of the certain region of the right-eye image are increased.

If the brightness of the certain region of the left-eye image or the brightness of the certain region of the right-eye image is already approximate to the maximum brightness of the display apparatus 200, it is possible that the brightness of the certain region of the left-eye image or the brightness of the certain region of the right-eye image are not increased up to a target brightness value.

To address this issue, the brightness of the left-eye image 710 and the brightness of the right-eye image 720 may undergo image scaling 730.

If the brightness of the left-eye image 710 and the brightness of the right-eye image 720 undergo the image scaling 730, it may be based on the following expression (1).

$$L'n(X)=Ln(X)*M/(2*Kn)$$

$$R'n(X)=Rn(X)*M/(2*Kn) \qquad \text{Expression (1)}$$

where, L'n(X) denotes a scaled brightness of the left-eye image Ln(X), R'n(X) denotes a scaled brightness of the right-eye image Rn(X), n denotes a serial number of each image, X denotes pixel coordinates (i, j) of each image, K denotes the maximum brightness difference between the brightness of the left-eye image (Ln(X)) 710 and the brightness of the right-eye image (Rn(x)) 720, and M denotes the maximum brightness supported by the display apparatus 200.

For example, M is 255 in a 8-bit system, and M is 1023 in a 10-bit system.

If the overlap image is calculated 740 on the basis of the expression (1), the following expression (2) is obtained.

$$O1n(X)=\min(L'n(X),R'n(X)) \qquad \text{Expression (2)}$$

The overlap image O1n(X) has the minimum brightness between the brightness of the left-eye image L'n(X) and the brightness of the right-eye image R'n(X) calculated by the expression (1).

As described with reference to FIG. 5, if the overlap image O1n(X) is calculated on the basis of the brightness of the left-eye image 710 and the brightness of the right-eye image 720, the brightness of the certain region where the "different points" of the left-eye image 710 and the right-eye image 720 are not overlapped is increased.

The scaled left-eye image L'n(X) is image enhanced 750 and the scaled right-eye image R'n(X) is image enhanced 760. That is, the scaled left-eye image and the scaled right-eye image are increased in brightness by the expression (3)

$$L1n(X)=2*L'n(X)-O1n(X)$$

$$R1n(X)=2*R'n(X)-O1n(X) \qquad \text{The expression (3)}$$

Here, L1n(X) denotes a left-eye image increased in brightness from the left-eye image L'n(X), and R1n(X) denotes a right-eye image increased in brightness from the right-eye image R'n(X).

Referring to FIG. 7, if the brightness of the left-eye image is similar to the brightness of the right-eye image, the brightness of the certain region of the left-eye image and the brightness of the certain region of the right-eye image are not increased.

If the brightness of the left-eye image is different from the brightness of the right-eye image, at least one of the brightness of the certain region of the left-eye image and the brightness of the certain region of the right-eye image is increased.

The image processing unit 210 sends the left-eye image (L1n(X)) 770 that is increased in brightness, the right-eye image (R1n(X)) 780 that is increased in brightness, and the overlap images (O1n(X)) 790 and 791 to the image outputting unit 220, so that the image outputting unit 220 can output the above images to the display unit 230.

The left-eye shutter 321 of the 3D glasses may be synchronized with the left-eye image (L1n(X)) 770 that is increased in brightness and the overlap image (O1n(X)) 790. Similarly, the right-eye shutter 322 of the 3D glasses may be synchronized with the right-eye image (R1n(X)) 780 that is increased in brightness and the overlap image (O1n(X)) 791.

FIG. 1 illustrates that the black images 120 and 140 are inserted between the left-eye image 110 and the right-eye image 130 and thus the left-eye image 110 and the right-eye image 130 are decreased in brightness, but FIG. 7 illustrates that the overlap images (O1n(X)) 790 and 791 are inserted between the left-eye image (L1n(X)) 770 and the right-eye image (R1n(X)) 780.

To recover the brightness decreased as shown in FIG. 1, a total current level may be made higher or a peak current may be increased. However, an exemplary embodiment shown in FIG. 7 increases only the certain regions of the left-eye image 710 and the right-eye image 720, so that the peak current cannot be increased even though the total current level increases.

In the case of a still image, the overlap image 790 inserted between the left-eye image 770 and the right-eye image 780 may be the same as the overlap image 791 inserted between the left-eye image 791 and the right-eye image 780.

The overlap images 791 may be generated on the basis of at least one of a neighboring preceding left-eye image 792 and a neighboring following right-eye image 780. Similarly, the overlap image 790 may be generated on the basis of at least one of a neighboring preceding right-eye image 780 and a neighboring following left-eye image 770.

Also, the left-eye image 770, the overlap image 790 and the right-eye image 780 may be continuously sent to the image outputting unit 220 while alternating one another.

The image processing unit 210 adjusts each brightness of the left-eye image 710 and the right-eye image 720 to be equal to or lower than a threshold brightness so as to prevent a maximum brightness limitation due to the increase of the brightness, and generates the overlap image O1n(X) based on the left-eye image L'n(X) adjusted in brightness and the right-eye image R'n(X) adjusted in brightness.

The image processing unit 210 increases the brightness of the certain region of at least one of the left-eye image L'n(X) adjusted in brightness and the right-eye image R'n(X) adjusted in brightness, and transmits the left-eye image L1n(X) increased in brightness and the right-eye image R1n(X) increased in brightness to the image outputting unit 220.

The image outputting unit 220 may control the above images to be output to the display unit 230.

The image processing unit 210 may perform the foregoing processes for generating the overlap image O1n(X).

Figure 8:
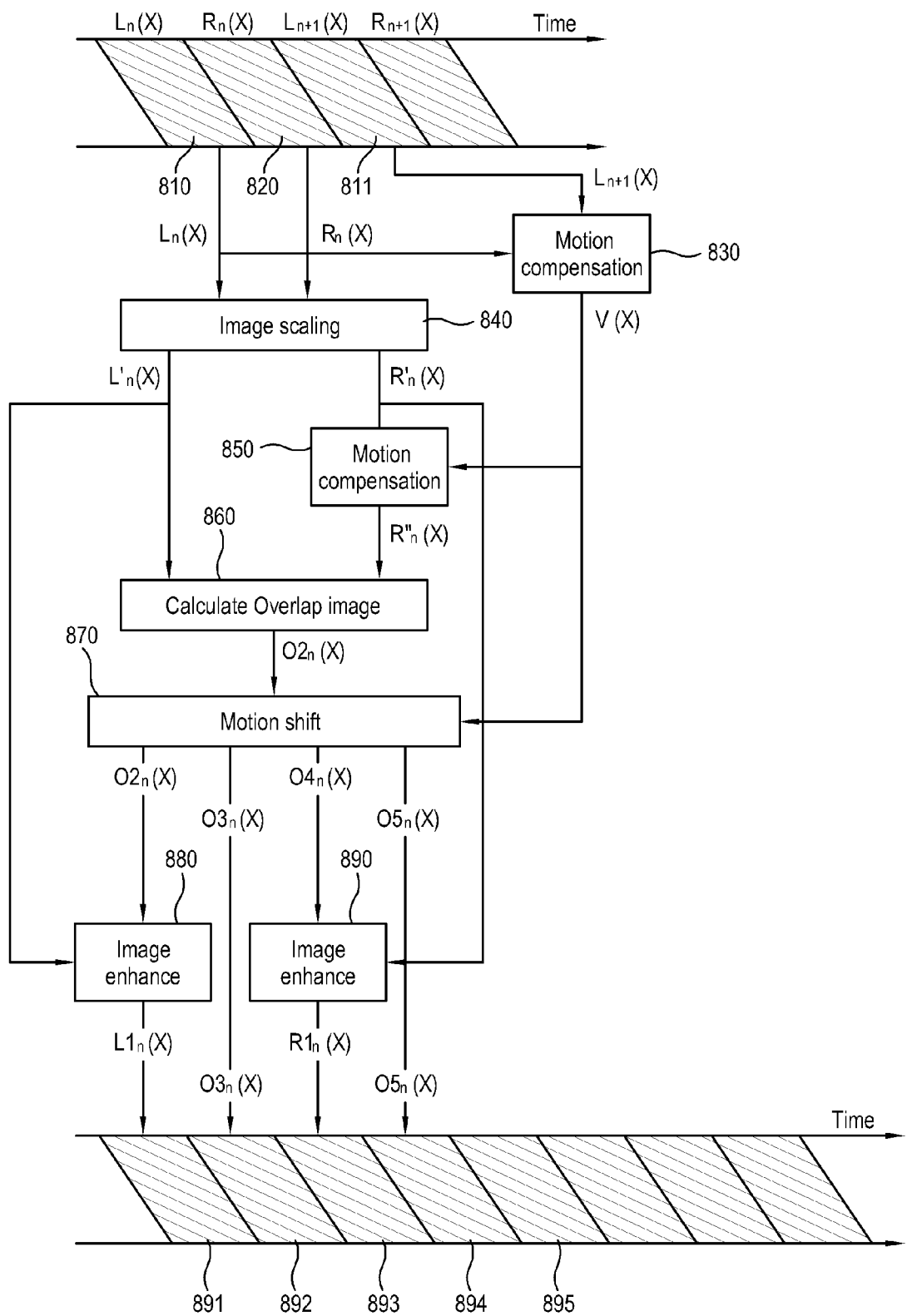
FIG. 8 shows an example of generating an overlap image when a 3D image according to an exemplary embodiment is a moving picture.

FIG. 8 shows an example of generating an overlap image when a 3D image according to an exemplary embodiment is a moving picture.

The principle shown in FIG. 8 is approximately the same as that shown in FIG. 7. In this exemplary embodiment, if a left-eye image for a moving picture and a right-eye image for the moving picture are used to generate an overlap image, the overlap image is added with a distance moved during a time between when the left-eye image is displayed and when the next left-eye image is displayed, or a distance moved during a time between when the right-eye image is displayed and when the next right-eye image is displayed.

Referring to FIG. 8, the overlap image inserted between the left-eye image 810 and the right-eye image 820 is generated using the left-eye image 810 and the right-eye image 820, and the overlap image inserted between the right-eye image 820 and the next left-eye image 811 is generated using the right-eye image 820 and the next left-eye image 811.

The overlap image may be generated using the left-eye image and right-eye image neighboring to the overlap image.

Referring to FIG. 8, there is a moving distance between the left-eye image 810 and the next left-eye image 811 since the left-eye image 810 and the next left-eye image 811 are a moving picture.

The moving distance can be represented by a motion vector V(X).

Motion compensation 830 reflects the moving distance to the left-eye image 810. The motion compensation 830 calculates a difference from the next left-eye image 811 using the following expression (4).

$$Ln(X)=Ln+1(X-V(X)), \text{ or } Ln(X+V(X))=Ln+1(X) \quad \text{Expression (4)}$$

Like those of FIG. 7, to avoid the maximum brightness limitation due to the increase in brightness, the brightness of the left-eye image 810 and the brightness of the right-eye image 820 undergo image scaling 840.

The scaling for the left-eye image (Ln(X)) 810 and the right-eye image (Rn(X)) 820 may be based on the following expression (5).

$$L'n(X)=Ln(X)*M/(2*Kn)$$

$$R'n(X)=Rn(X)*M/(2*Kn) \quad \text{Expression (5)}$$

where, L'n(X) indicates a scaled brightness of the left-eye image Ln(X), R'n(X) indicates a scaled brightness of the right eye image Rn(X), n indicates a serial number, X indicates pixel coordinates (i, j) of each image, K indicates a maximum brightness between the brightness of the left-eye image (Ln(X)) 810 and the brightness of the right-eye image (Rn(X)) 820, and M is a maximum brightness supported by the display apparatus 310.

To generate the overlap image inserted between the right-eye image 820 and the next left-eye image 811, a motion vector existing between the left-eye image 810 and the next left-eye image 811 is calculated and then reflected by motion compensation 850 to the right-eye image 820.

The right eye-image R"n(X) to which the motion compensation 850 is performed is represented by the following expression (6).

$$R''n(X)=R'n((X-V(X))/2) \quad \text{Expression (6)}$$

Here, the motion vector V(X) is a difference between the left-eye image 810 and the next left-eye image 811, and thus the motion vector to be reflected to the right-eye image 820 is decreased by half.

The calculation of the overlap image 860 using the left-eye image R"n(X) to which the motion vector is reflected and the left-eye image (Ln(X)) 810 is represented by the expression (7).

$$O2n(X)=\min(L'n(X), R''n(X)) \quad \text{Expression (7)}$$

The overlap image O2n(X) has the minimum brightness between the brightness of the left-eye image L'n(X) calculated by the expression (5) and the brightness of the right-eye image R"n(X).

The motion vector V(X) denotes the moving distance between the left-eye image 810 and the next left-eye image 820, and thus a quarter of the motion vector V(X) is reflected to the overlap image 892 inserted between the left-eye image 810 and the right-eye image 820.

Likewise, a half of the motion vector is reflected to the right-eye image 820, and three-fourths of the motion vector is reflected to the overlap image 894 inserted between the right-eye image 820 and the next left-eye image 811. Thus, in this way, motion is shifted (870).

The overlap image to which the motion vector is reflected (i.e., which is motion shifted) is represented by the expression (8).

$$O3n(X)=O2n(X+V(X)/4)$$

$$O4n(X)=On(X+V(X)/2)$$

$$O5n(X)=O2n(X+3*V(X)/4) \quad \text{Expression (8)}$$

where, $O3n(X)$ indicates an overlap image obtained by reflecting a quarter of the motion vector to the overlap image $O2n(X)$, $O4n(X)$ indicates an overlap image obtained by reflecting two-fourths of the motion vector to the overlap image $O2n(X)$, and $O5n(X)$ indicates an overlap image obtained by reflecting three-fourths of the motion vector to the overlap image $O2n(X)$.

The scaled left-eye image $L'n(X)$ is increased in brightness (i.e., image enhanced 880) and combined with the overlap image $O2n(X)$, thereby generating the left-eye image $L2n(X)$ 891 to which the motion vector is reflected.

The scaled right-eye image $R'n(X)$ is increased in brightness (i.e., image enhanced 890) and combined with the overlap image $O4n(X)$, thereby generating the right-eye image $R2n(X)$ 893 to which the motion vector is reflected.

The left-eye image $L2n(X)$ 891 to which the motion vector is reflected and the right-eye image $R2n(X)$ 893 to which the motion vector is reflected are represented by the following expression (9).

$$L2n(X)=2*L'n(X)-O2n(X)$$

$$R2n(X)=2*R'n(X)-O4n(X) \quad \text{Expression (9)}$$

where, $L2n(X)$ is a left-eye image obtained by reflecting the motion vector to and increasing the brightness of the left-eye image $L'n(X)$, and $R2n(X)$ is a right-eye image obtained by reflecting the motion vector to and increasing the brightness of the left-eye image $R'n(X)$.

If a 3D image is a moving picture, the motion vector may cause the overlap image 892 inserted between the left-eye image 891 and the right-eye image 893 to be different from the overlap image 894 inserted between the right-eye image 893 and the next left-eye image 895.

The image processing unit 210 may generate the left-eye image 891, the right-eye image 893 and the overlap images 892 and 894 on the basis of the motion vector.

Figure 9:
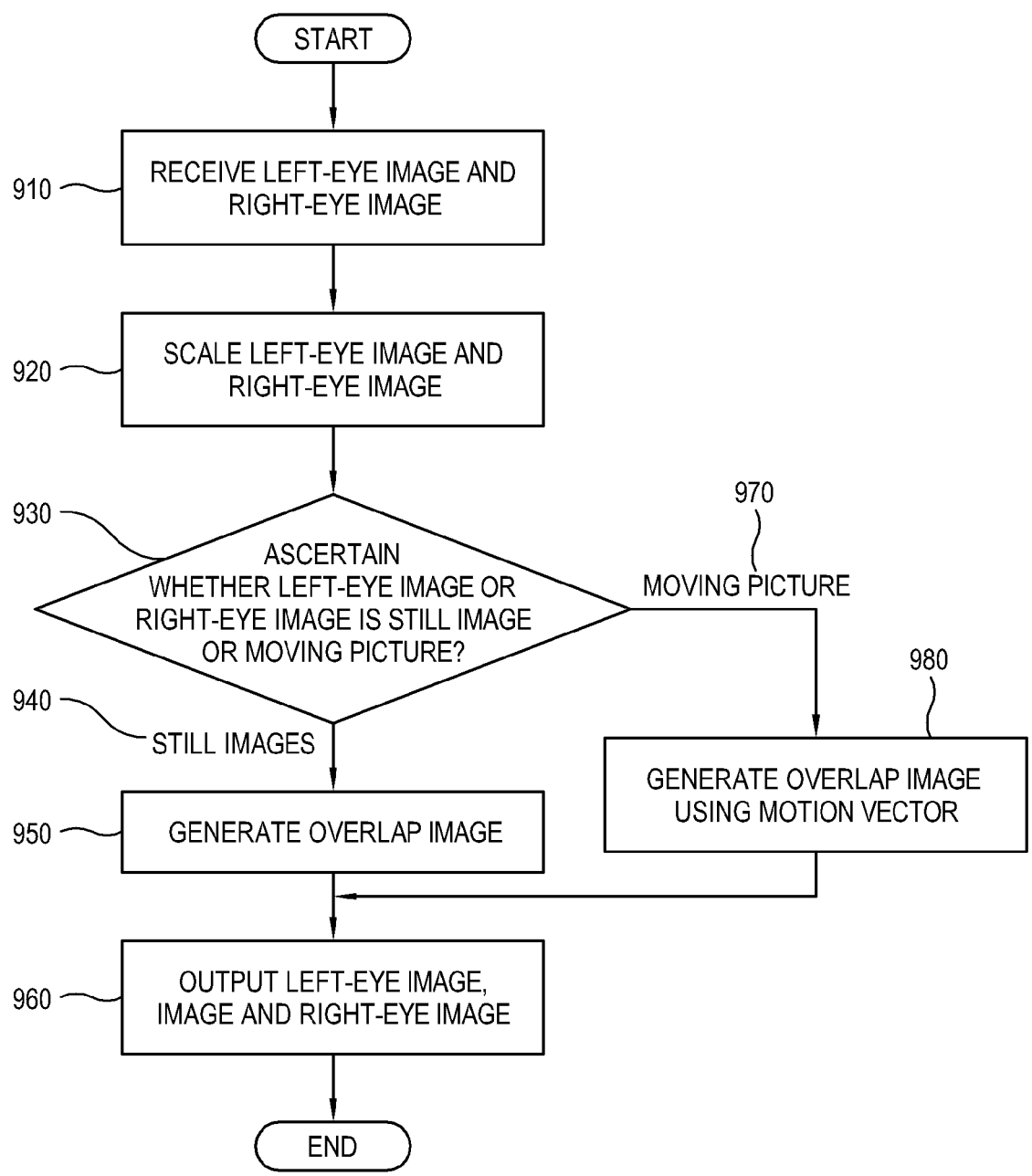
FIG. 9 is a flowchart of a method for displaying a 3D image according to an exemplary embodiment.

FIG. 9 is a flowchart of a method for displaying a 3D image according to an exemplary embodiment.

Referring to FIG. 9, the 3D image providing apparatus 200 may receive a left-eye image and a right-eye image (910).

The 3D image providing apparatus 200 may receive the left-eye image and the right-eye image from the exterior, or may internally generate the left-eye image and the right-eye image.

Through the menu displayed on the display panel 212, a user may select whether to use the black image or the overlap image as an image to be inserted between the left-eye image and the right-eye image.

If the black image is selected, an electric current applied to the display unit 230 may be increased in order to increase the brightness of the left- and right-eye images focused on a user's left and right eyes.

If the overlap image is selected, the received left- and right-eye images may be scaled (920) due to the maximum brightness limitation.

To generate the overlap image using the scaled left-eye image and the scaled right-eye image, it is ascertained whether the scaled left-eye image or the scaled right-eye image is a still image or a moving picture (930).

If the scaled left-eye image or the scaled right-eye image is a still image (940), the overlap image can be generated using the scaled left-eye image or the scaled right-eye image (950).

The generated overlap image may be inserted between the scaled left-eye image and the scaled right-eye image.

Also, the generated overlap image may be inserted between the scaled right-eye image and the scaled next left-eye image.

The scaled left-eye image, the scaled right-eye image and the overlap image may be output through the image outputting unit 220 (960).

On the other hand, in operation 930, if the scaled left-eye image or the scaled right-eye image is a moving picture (970), a moving distance, i.e., a motion vector between the received left-eye image and the received next left-eye image, is calculated.

The overlap image may be generated using the motion vector (980). That is, the motion vector may be reflected to the overlap image to be inserted between the scaled left-eye image and the scaled right-eye image.

The motion vector may be applied as a different value to the scaled left-eye image, the scaled right-eye image and the overlap image displayed on the display panel 212 at different times.

The left-eye image, the right-eye image and the overlap image, to which the different motion vectors are reflected, may be output (960) through the image outputting unit 220.

The overlap image inserted between the left-eye image to which the different motion vector is reflected and the right-eye image to which the different motion vector is reflected may be different from the overlap image inserted between the right-eye image to which the different motion vector is reflected and another left-eye image to which the different motion vector is reflected.

Methods according to the above exemplary embodiments may be achieved in the form of program instruction to be implemented by various computer means, and recorded in a computer readable medium. The computer readable medium may independently include program instruction, data files, data structure, etc. or combination thereof. The program instruction recorded in the medium may be specially designed or configured for the above exemplary embodiments, or well-known to and used by a person having an ordinary skill in computer software. Moreover, the 3D display apparatus 200 may include one or more central processing units (CPUs) with one or more memories. Thus, the image processing unit 210, the image outputting unit 220, and the display unit 230 may be implemented using one or more CPUs alone or in conjunction with one or more external memories.

As described above, the 3D image passing through the 3D glasses and focused on a user can be increased in brightness.

Although a few exemplary embodiments have been shown and described, it will be appreciated by those skilled in the art that changes may be made in these exemplary embodiments without departing from the principles and spirit of the present inventive concept, the scope of which is defined in the appended claims and their equivalents.

What is claimed is:

1. An apparatus for providing a three-dimensional (3D) image, the apparatus comprising:
   a display panel;
   an image processing unit which receives a left-eye image and a right-eye image, estimates an overlap region of the left-eye image and right-eye image, and generates an overlap image based on the estimated overlap region; and
   an image outputting unit which controls the left-eye image, the right-eye image and the overlap image to be output to the display panel,
   wherein pixel values of the overlap image are determined based on a pixel comparison between the left-eye image and the right-eye image.

2. The apparatus according to claim 1, wherein the image processing unit determines a pixel value of a first region of the overlap image relevant to the overlap region based on a pixel value of the left-eye image or right-eye image, and determines a pixel value of a second region irrelevant to the overlap region based on one of the left-eye image and the right-eye image in accordance with a pixel brightness comparison.

3. The apparatus according to claim 1, wherein the overlap region is estimated based on blocks of pixels, or based on individual pixels.

4. The apparatus according to claim 1, wherein the overlap region comprises a first region configured with one of a brightness of the left-eye image and a brightness of the right-eye image, and a second region configured with a minimum brightness between the brightness of the left-eye image and the brightness of the right-eye image.

5. The apparatus according to claim 1, wherein the image processing unit adjusts a brightness of each of the left-eye image and the right-eye image to be equal to or lower than a threshold brightness, and generates the overlap image based on the left-eye image that has been adjusted in brightness and the right-eye image that has been adjusted in brightness.

6. The apparatus according to claim 5, wherein the image processing unit increases a brightness of a part of at least one of the left-eye image that has been adjusted in brightness and the right-eye image that has been adjusted in brightness, and sends the left-eye image or the right-eye image which has the part which has been increased in brightness, to the image outputting unit.

7. The apparatus according to claim 1, wherein the overlap image is configured with a minimum brightness between a brightness of a pixel of the left-eye image, and a brightness of a pixel of the right-eye image that is located at a position that corresponds to the pixel of the left-eye image.

8. The apparatus according to claim 1, wherein the image outputting unit outputs the generated images to the display panel so that the left-eye image, the overlap image and the right-eye image are sequentially displayed.

9. The apparatus according to claim 1, wherein
   the left-eye image and the right-eye image are moving pictures, respectively, and
   a brightness of a pixel of the left-eye image and positions corresponding to pixels of the left-eye image are determined by taking into account a motion vector of an object included in the right-eye image.

10. The apparatus according to claim 1, further comprising:
    3D glasses; and
    a controller that controls synchronization between the 3D glasses, and the left-eye image, the right-eye image and the overlap image.

11. The apparatus according to claim 10, wherein the 3D glasses comprise shutters, and the controller controls on/off of the shutters of the 3D glasses so that the shutters are synchronized with at least one of the left-eye image, the right-eye image and the overlap image.

12. An apparatus for providing a three-dimensional (3D) image, the apparatus comprising:
    a display panel;
    an image processing unit which receives a left-eye image and a right-eye image; and
    a display window which displays a brightness mode for selecting enhanced brightness of the left-eye image and right-eye image,
    wherein the image processing unit, upon receiving a selection of the brightness mode, estimates an overlap region of the left-eye image and right-eye image, and generates an overlap image based on the estimated overlap region.

13. An apparatus for generating a three-dimensional (3D) image, the apparatus comprising:
    an image generating unit which generates a left-eye image and a right-eye image, and generates an overlap image configured with a minimum brightness between a brightness of a pixel of the left-eye image, and a brightness of a pixel of the right-eye image that is located at a position that corresponds the pixel of the left-eye image; and
    an image outputting unit which outputs the generated left-eye image, the generated right-eye image and the generated overlap image.

14. A method of providing a three-dimensional (3D) image, the method comprising:
    receiving a left-eye image and a right-eye image;
    estimating an overlap region of the left-eye image and right-eye image;
    generating an overlap image based on the estimated overlap region; and
    controlling the left-eye image, the right-eye image and the overlap image to be output,
    wherein pixel values of the overlap image are determined based on a pixel comparison between the left-eye image and the right-eye image.

15. The method according to claim 14, wherein the generation of the overlap image comprises
    determining a first region of the overlap image relevant to the overlap region based on a pixel value of the left-eye image or right-eye image; and
    determining a second region irrelevant to the overlap region based on one of the left-eye image and the right-eye image in accordance with a pixel brightness comparison.

16. The method according to claim 14, wherein the overlap region is estimated based on blocks of pixels, or based on individual pixels.

17. The method according to claim 14, wherein the overlap region comprises a first region configured with one of a brightness of the left-eye image and a brightness of the right-eye image, and a second region configured with a minimum brightness between the brightness of the left-eye image and the brightness of the right-eye image.

18. The method according to claim 14, wherein the generating the overlap image comprises:
    adjusting a brightness of each of the left-eye image and the right-eye image to be equal to or lower than a threshold brightness; and generating the overlap image based on the left-eye image that has been adjusted in brightness and the right-eye image that has been adjusted in brightness.

19. The method according to claim 18, wherein the generating the overlap image comprises:
increasing a brightness of a part of at least one of the left-eye image that has been adjusted in brightness and the right-eye image that has been adjusted in brightness; and
outputting the left-eye image or the right-eye image which has the part which has been increased in brightness.

20. The method according to claim 14, wherein the overlap image is generated based on a minimum brightness between a brightness of a pixel of the left-eye image, and a brightness of a pixel of the right-eye image that is located at a position that corresponds to the pixel of the left-eye image.

21. The method according to claim 14, wherein the controlling comprises outputting the left-eye image, the right-eye image and the overlap image so that the left-eye image, the overlap image and the right-eye image are sequentially displayed.

22. The method according to claim 14, wherein
the left-eye image and the right-eye image are moving pictures, respectively, and
a brightness of a pixel of the left-eye image and positions corresponding to pixels of the left-eye image are determined by taking into account a motion vector of an object included in the right-eye image.

23. The method according to claim 14, further comprising controlling synchronization between 3D glasses and the left-eye image, the right-eye image and the overlap image.

24. The method according to claim 23, wherein the controlling synchronization comprises controlling on/off of shutters of the 3D glasses so that the shutters are synchronized with at least one of the left-eye image, the right-eye image and the overlap image.

25. A method for providing a three-dimensional (3D) image, the method comprising:
receiving a left-eye image and a right-eye image; and
displaying a brightness mode for selecting enhanced brightness of the left-eye image and right-eye image;
receiving a selection of the brightness mode; and
upon receiving the selection of the brightness mode, estimating an overlap region of the left-eye image and right-eye image, and generating an overlap image based on the estimated overlap region.

26. A method for generating a three-dimensional (3D) image, the method comprising:
generating a left-eye image and a right-eye image;
generating an overlap image configured with a minimum brightness between a brightness of a pixel of the left-eye image, and a brightness of a pixel of the right-eye image that is located at a position that corresponds to the pixel of the left-eye image; and
outputting the generated left-eye image, the generated right-eye image and the generated overlap image.

27. A three-dimensional (3D) imaging system comprising:
a display apparatus which displays a left-eye image, a right-eye image and an overlap image; and
3D glasses which comprises shutters operating in sync with the left-eye image, the right-eye image and the overlap image and driven in accordance with a voltage,
wherein the overlap image is formed according to a minimum brightness between a brightness of a pixel of the left-eye image, and a brightness of a pixel of the right-eye image that is located at a position that corresponds to the pixel of the left-eye image.

28. The system according to claim 27, wherein the shutters are controlled by adjusting an amplitude of the voltage.

29. The system according to claim 27, wherein
the shutters comprise a left-eye shutter and a right-eye shutter,
the left-eye image and an overlap image neighboring to the left-eye image are synchronized with the left-eye shutter, and
the right-eye image and an overlap image neighboring to the right-eye image are synchronized with the right-eye shutter.

30. A non-transitory computer readable medium recording a program for implementing the method comprising:
receiving a left-eye image and a right-eye image;
estimating an overlap region of the left-eye image and right-eye image;
generating an overlap image based on the estimated overlap region; and
controlling the left-eye image, the right-eye image and the generated overlap image to be output,
wherein pixel values of the overlap image are determined based on a pixel comparison between the left-eye image and the right-eye image.

* * * * *